Patented Aug. 12, 1941

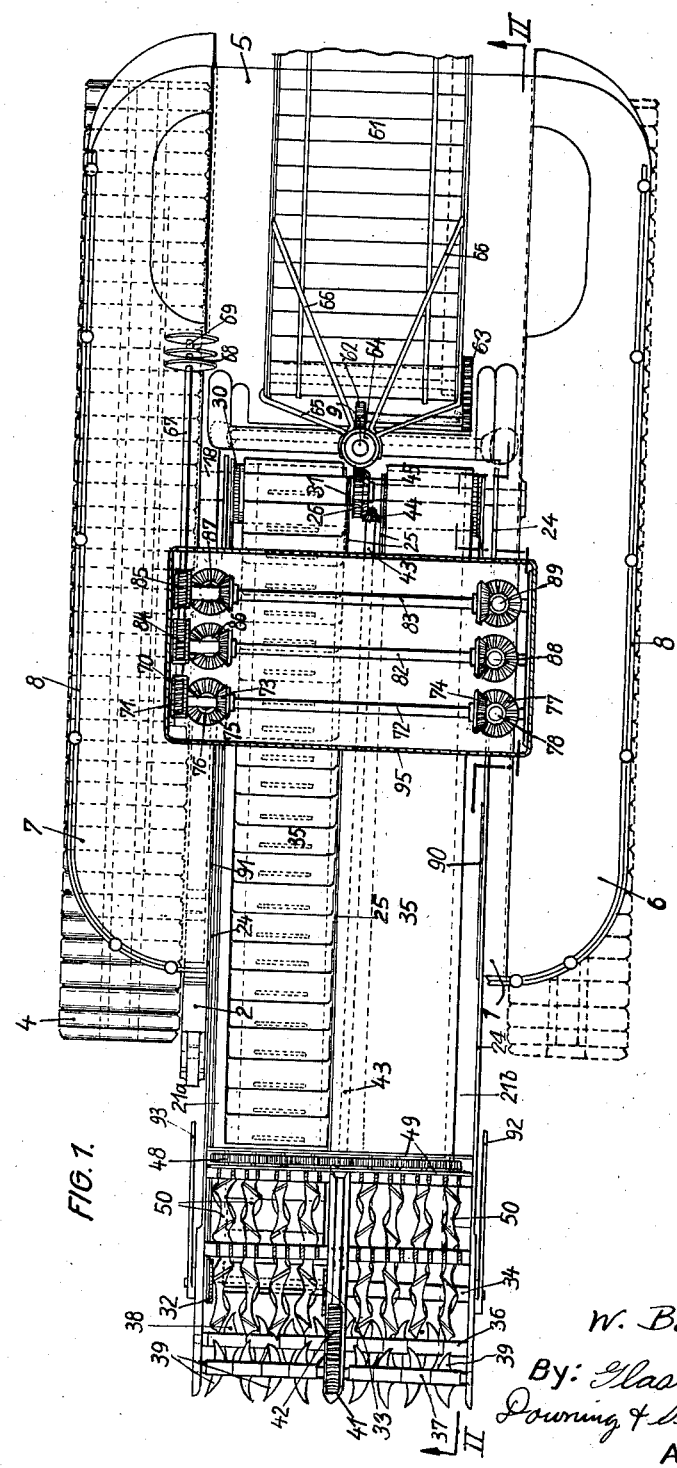

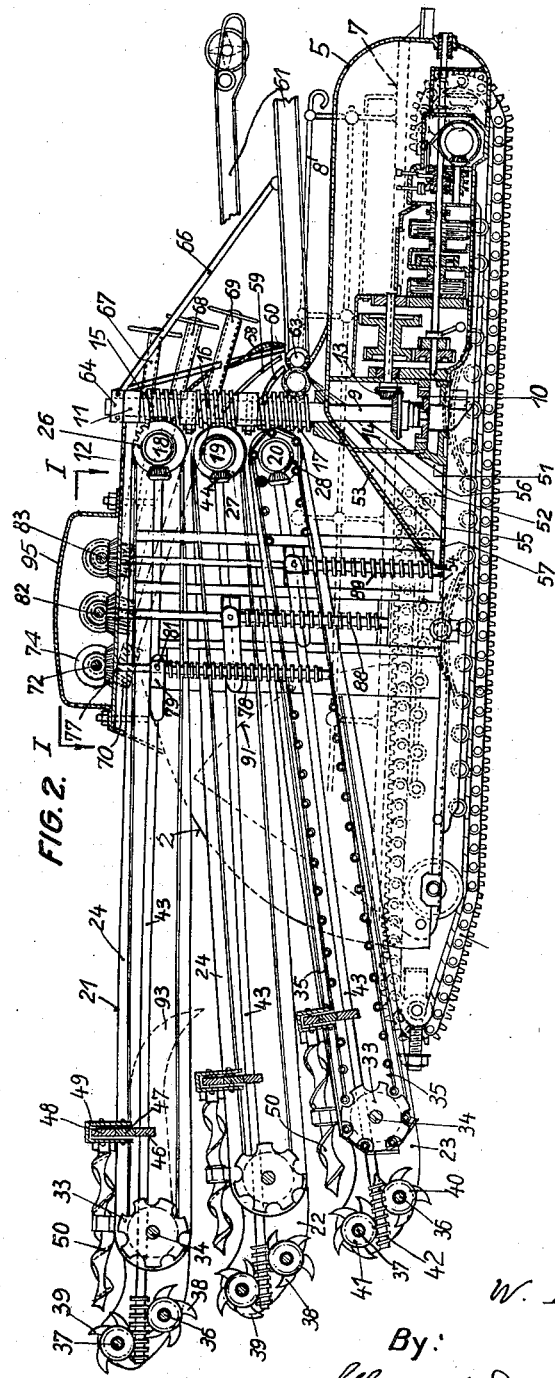

2,252,477

UNITED STATES PATENT OFFICE 2,252,477

CULTIVATING MACHINE

Wilhelm Bauer, Hamburg-Wilhelmsburg, Germany

Application December 16, 1938, Serial No. 246,245
In Germany December 16, 1937

6 Claims. (Cl. 37—96)

My invention relates to cultivating machines.

It is an object of my invention to provide an improved machine of this kind in which the soil is worked thoroughly, and solid bodies in the soil, such as clods, roots, stones, etc., are broken, whereupon the worked soil is removed.

To this end, in combination with a pair of rotary working tools in the frame of the machine which rotate in opposite directions, and an elevator arranged in spaced relation at the rear of the working tools, I proved rotary feeding tools which are arranged side by side intermediate the working tools and the front end of the elevator, and each two of which rotate in opposite directions, and means at the rear end of the elevator for discharging the worked soil.

It is another object of my invention to so design the abovesaid cultivating machine that it can dig trenches of various depths to bring up the soil from superimposed layers of different character, and discharge the different kinds of worked soil separately, or mix them.

To this end, I arrange arms on the frame at various inclinations, and on each arm I mount a set of tools and an elevator, as described. At the end of each elevator, I provide a discharge chute for discharging the soil from the corresponding elevator, a mixing chute which is adapted to be used alternately with each of the discharge chutes, and a conveyer arranged to receive the land from the mixing chutes, so that the soil is selectively discharged or mixed, as desired.

In a preferred embodiment of this last-mentioned machine, I arrange the arms pivotally on the frame and equip each arm with means for swinging it about its pivot independently of the other arm, or arms.

By these means, I can dig up, work, and, if desired, mix the soils from as many layers of ground as there are arms on the machine.

Other objects of my invention will appear from the following detailed description and the accompanying drawing in which a cultivating and trench-digging machine with three pivoted arms is illustrated by way of example.

In the drawings

Fig. 1 is partly a plan view of the machine and partly a section on the line I—I of Figure 2.

Fig. 2 is an elevation of the machine, with parts broken away, and other parts shown in section on the line II—II of Fig. 1.

Referring now to the drawings, the frame of the machine comprises a pair of side plates 1 and 2, mounted to run on caterpillar tracks 3 and 4, respectively, and a casing 5 to which the rear ends of the side plates are connected. In the casing, an internal combustion engine and the mechanisms required for the operation of the machine are housed. These parts will not be described as they form no part of my invention. The top of the casing 5 is the driver's footplate, and runways 6 and 7, each with a railing 8, extend in the fore-and-aft direction of the machine, along the outer sides of the respective frame plates 1 and 2.

A vertical driving shaft 9 is mounted in the central vertical plane of the machine, and supported in a thrust bearing 10 at its lower end. The upper end of the driving shaft 9 rotates in a bearing 11 which is integral with, or secured to, the top plate 12 of the machine. The shaft is rotated from a lay shaft in the casing 5 through bevel gearing 13, 14.

The vertical driving shaft 9 has three threaded portions 15, 16, and 17. Arranged opposite each threaded portion is a horizontal shaft, or pivot, 18, 19, 20, respectively. The shafts, here shown tubular, are mounted to rotate in the side plates 1 and 2. Arms 21, 22, and 23 are mounted to swing about the respective horizontal shafts with their rear ends. In the example illustrated, each arm is subdivided into sections arranged side by side on the corresponding shaft, as shown at 21a and 21b for the topmost arm 21. Each section comprises an outer side plate 24 and an inner side plate 25. The three shafts are rotated from the threaded portions of the vertical driving shaft 9 through worm gears 26, 27, and 28. Sprockets 30 and 31 are keyed on each shaft between the side plates 24 and 25 of the sections, and corresponding sprockets 32 and 33 are keyed on a shaft 34 near the free end of each arm which extends across both sections. An elevator 35 whose links are equipped with lugs, is placed on the four sprockets in each section. In Fig. 1, the inner side plate of the lowest arm section 23 is broken away to show the sprocket 33 and part of the elevator 35.

At its free end, each arm section is provided with an upwardly extending portion in which are mounted to rotate a pair of shafts 36 and 37. The shafts support working tools 38 and 39, respectively, with pointed blades. Worm gears 40 and 41 on the shafts 36 and 37 mesh with a worm 42 at the outer end of a shaft 43 which is arranged between the two sections of each arm. At its inner end, the shaft 43 is equipped with a bevel pinion 44 meshing with a bevel gear 45 which is keyed on the shaft 18 at the side of the worm wheel 26. A similar arrangement is provided for the shafts 19 and 20 the arms 22 and 23 swung about. It will appear that when the shafts 18, 19, and 20 are rotated, the shafts 43 in the arms also rotate and transmit their rotation to the tool shafts 36 and 37 in opposite directions.

A helical gear 46 is keyed on each shaft 43 and, through an intermediate gear 47, rotates a set of eight helical gears 48 in a frame 49 which extends across the two sections of each arm. Mounted on an extension of the shaft of each gear 48 which projects beyond the front side of the frame 49 is a helical feeding tool 50 intermediate the working tools 38, 39 and the front end of the elevator 35.

The soil which has been worked by the tools 38, 39, is fed to the elevator 35 by the tools 50, and delivered to chutes 51, 52, and 53 which convey it to openings 54, 55, and 56, respectively, in the base plate 57 of the machine. By these means, the soil from the elevators in the arms is delivered separately. If it is desired to mix soils dug from layers at various depths, chutes 58, 59, and 60 are placed in position instead of the chutes 51, 52, and 53, and deliver the soil to a conveyor 61 which deposits the mixed soils at the rear of the machine as it advances on its caterpillar tracks 3 and 4. Only the front end of the conveyer 61 is shown. A worm wheel 62 meshing with the lowermost threaded portion 17 of the shaft 9, rotates the front sprocket 63 of the conveyer. The conveyer 61 is suspended from the vertical driving shaft 9 by an eye 64 from which pairs of tension rods 65 and 66 extend to the conveyer frame.

Mechanism is provided for swinging each arm about its shaft, or pivot, independently of the other arms. Three inclined control shafts 67, 68, and 69 are mounted one above the other at the outer side of the right-hand frame plate 2, and each shaft at its lower end supports a hand wheel in a convenient position for manipulation by the driver.

The mechanism by which the topmost arm 21 is swung upon manipulation of the hand wheel on its control shaft 69, will now be described. At its front end, the control shaft 69 is provided with a worm 70. This worm meshes with a worm gear 71 on a horizontal shaft 72 which is mounted to rotate in a casing 95 on the top plate 12. This shaft supports a pair of bevel gears 73 and 74 pitched at a distance substantially equal to the overall width of the arm 21. A vertical threaded spindle 76 is arranged below the shaft 72 at the right, and connected to the bevel gear 73 by a bevel gear 75 at its upper end. A similar spindle 78 at the left is connected to the bevel gear 74 by a bevel gear 77 at its upper end. A nut 79 is placed on the spindle 78 and a pin 81 projecting from the inner side of the nut engages in a slot 80 in the outer side plate 24 of the section 21b. A similar arrangement is provided for the spindle 76 at the right. This has not been illustrated. When the driver turns the hand wheel on the shaft 76 in a given direction, the spindles 76 and 78 are rotated and, through their nuts and pins, raise or lower the arm 21.

In the same manner, horizontal shafts 82, 83, worm wheels 84 and 85, and vertical spindles 86, 88 and 87, 89 are provided for operating the arms 22 and 23 through the control shafts 68 and 67. These mechanisms will not be described in detail.

To support the walls of the trench excavated by the machine, sectors 90 and 91 are pivoted to the frame plates 1 and 2 at their inner sides, and are lowered into the trench by means, not illustrated.

For removing stumps of trees and other foreign objects, claws 92 and 93 can be placed on the ends of the shaft 34, as shown for the arm 21.

My machine is particularly useful for the cultivation of moor and other uncultivated land where several layers of different soils are present, and the soil from each layer is to be brought up separately. The maximum depth to which the free end of an arm 21, 22, 23 can be lowered, is normally ten feet, but it may be more if required. Any number of arms may be provided and each arm brings up the soil of its layer in thoroughly cut-up, worked, and loose condition. Any foreign substances such as wood, tree stumps, stones, etc. are broken by the working and feeding tools 38, 39, and 50 so that the soil is in condition to be delivered to the elevators 35. Part of the elevators' work is performed by the feeding tools 50 so that the elevators are relieved. The soil, being thoroughly worked and loose, does not stick and is readily discharged through the chutes 51, 52, and 53, or delivered to the conveyer 61 through the chutes 58, 59, and 60, as desired. On the conveyer, the soils are mixed, and lime and/or artificial manure may be added.

My machine can also be used for leveling.

As compared with known machines of this type, in which also rotary tools are employed, my machine has the advantage that it can perform a great variety of operations at a time, as follows:

1. It brings up and works several different layers of soil at the same time and carries such soils to where they are wanted.

2. It works the soil thoroughly, makes it loose and aerates it; soils can be mixed as required.

3. It cuts up the soil and breaks smaller obstructions, such as small stones, small tree stumps, etc.

4. Large obstructions which cannot be broken, such as large stones, roots, stems, etc. are lifted and pushed aside by the claws 92, 93.

5. It will level the ground, if required.

6. It will excavate trenches and throw up the ground at the trench sides.

7. The sides of the trenches are supported by the sectors 90, 91.

8. The soil brought up by the machine can be transferred to carts or other vehicles.

9. In the cultivation of moor, virgin soil, deserts, marshes, etc., the work of the machine is superior in quality to manual labor.

I claim:

1. In a cultivating machine, a frame, a pair of rotary working tools on the frame, means for rotating the working tools in opposite directions, an elevator arranged in spaced relation at the rear of the working tools, means for operating the elevator, rotary feeding tools arranged side by side intermediate the working tools and the front end of the elevator, means for rotating each two feeding tools in opposite directions, and means at the rear end of the elevator for discharging the worked soil.

2. In a cultivating machine, a frame, a pair of rotary working tools on the frame, means for rotating the working tools in opposite directions, an elevator arranged in spaced relation at the rear of the working tools, means for operating the elevator, rotary helical feeding tools arranged side by side intermediate the working tools and the front end of the elevator, means for rotating each two feeding tools in opposite directions, and means at the rear end of the elevator for discharging the worked soil.

3. In a cultivating machine, a frame, a pair of rotary working tools on the frame, means for rotating the working tools in opposite directions, an elevator arranged in spaced relation at the rear of the working tools, means for operating the elevator, rotary feeding tools arranged side by side intermediate the working tools and the front end of the elevator, means for rotating each two feeding tools in opposite directions, a conveyer at the rear end of the machine, and means for selectively discharging the worked soil from the elevator, and for depositing it on the conveyer.

4. In a cultivating machine, a frame, a pair of rotary working tools on the frame, means for rotating the working tools in opposite directions, a claw arranged to rotate with one of the tools, an elevator arranged in spaced relation at the rear of the working tools, means for operating the elevator, rotary feeding tools arranged side by side intermediate the working tools and the front end of the elevator, means for rotating each two feeding tools in opposite directions, and means at the rear end of the elevator for discharging the worked soil.

5. In a cultivating machine, a frame, a pair of rotary working and trench-digging tools on the frame, means for rotating the working tools in opposite directions, an elevator arranged in spaced relation at the rear of the working and trench-digging tools, means for operating the elevator, rotary feeding tools arranged side by side intermediate the working and trench-digging tools and the front end of the elevator, means for rotating each two feeding tools in opposite directions, means at the rear end of the elevator for discharging the worked soil, and movable plates on both sides arranged to be lowered into, and to support the sides of, the trench.

6. In a cultivating machine, horizontal shafts, a vertical driving shaft, means for rotating the driving shaft, means for rotating each horizontal shaft from the driving shaft, an arm mounted to swing about each horizontal shaft, manual means for swinging each arm about its horizontal shaft independently of the other arms, soil-working and trench-digging means at the leading end of each arm, means for operating the soil working and trench-digging means from each corresponding horizontal shaft in any position of the arm, soil-elevating means arranged on each arm at the rear of, and spaced from, the working and trench-digging means, means on the corresponding horizontal shaft for driving the elevating means, soil feeding means arranged to bridge the gap between the working and trench-digging, and the elevating means, and mechanism operatively connected to said operating means for driving the soil feeding means.

WILHELM BAUER.